United States Patent
Logan, Jr. et al.

(10) Patent No.: US 11,338,902 B2
(45) Date of Patent: May 24, 2022

(54) HEAT SHIELD FOR AN AIRCRAFT

(71) Applicant: The Boeing Company, Chicago, IL (US)

(72) Inventors: Robert Everett Logan, Jr., Puyallup, WA (US); William Clifton Cromer, Seattle, WA (US); Genesis Marvin Pilarca, Shoreline, WA (US); Matthew Joseph Woerly, Renton, WA (US)

(73) Assignee: The Boeing Company, Chicago, IL (US)

( * ) Notice: Subject to any disclaimer, the term of this patent is extended or adjusted under 35 U.S.C. 154(b) by 198 days.

(21) Appl. No.: 16/575,158

(22) Filed: Sep. 18, 2019

(65) Prior Publication Data

US 2021/0078692 A1 Mar. 18, 2021

(51) Int. Cl.
*B64C 1/40* (2006.01)

(52) U.S. Cl.
CPC ......... *B64C 1/40* (2013.01); *Y10T 428/24174* (2015.01)

(58) Field of Classification Search
None
See application file for complete search history.

(56) References Cited

U.S. PATENT DOCUMENTS

| | | | |
|---|---|---|---|
| 7,927,686 B2 | 4/2011 | Zielinski et al. | |
| 7,943,227 B2 | 5/2011 | Connelly | |
| 9,688,412 B2* | 6/2017 | Peyruseigt | B64D 29/02 |
| 9,783,285 B2 | 10/2017 | Connelly | |
| 10,260,540 B2 | 4/2019 | Connelly et al. | |
| 2013/0105622 A1* | 5/2013 | Journade | B64D 29/02 244/54 |
| 2017/0259906 A1 | 9/2017 | Connelly et al. | |
| 2018/0029688 A1 | 2/2018 | Connelly et al. | |
| 2018/0057140 A1 | 3/2018 | Connelly et al. | |

FOREIGN PATENT DOCUMENTS

WO WO-2018154256 A1 * 8/2018 ........... D03D 25/005

OTHER PUBLICATIONS

"First A320neo to fly Pratt & Whitney PurePower PW1100G-JM engines are equipped on the first A320neo to fly, which is scheduled for its maiden takeoff on Sep. 25, 2014," Airbus S.A.S 2014, https://airbus-h.assetsadobe2.com/is/image/content/dam/products-and-solutions/commercial-aircraft/a320-family/a320neo/A320neo_details_PW_engine_close_up.jpg?wid=3626&fit=constrain.

* cited by examiner

*Primary Examiner* — Alexander S Thomas
(74) *Attorney, Agent, or Firm* — Yee & Associates, P.C.

(57) ABSTRACT

A heat shield for an aircraft. The heat shield comprises a lower skin configured to be exposed to exhaust heat of a jet engine, and side skins that are indirectly joined to the lower skin.

20 Claims, 10 Drawing Sheets

HEAT SHIELD FOR AN AIRCRAFT

BACKGROUND INFORMATION

1. Field

The present disclosure relates generally to aircraft and more specifically to a heat shield for an aircraft.

2. Background

Aircraft components are exposed to extreme temperatures during operation. Heat shields are provided in aircraft to protect temperature sensitive components from extreme temperatures.

During operation of an aircraft, the aircraft's jet engines generate exhaust heat. Components such as strut aft fairings positioned behind the jet engines will be undesirably affected by extreme heat. Strut aft fairings beneath the wings are protected from the exhaust heat by a strut aft fairing heat shield.

The strut aft fairing heat shield experiences extreme and variable temperatures. Thermal profiles in the skins of the strut aft fairing heat shield can cause undesirable effects such as distortion, buckling, or even cracking.

Therefore, it would be desirable to have a method and apparatus that takes into account at least some of the issues discussed above, as well as other possible issues.

SUMMARY

An example of the present disclosure provides a heat shield for an aircraft. The heat shield comprises a side skin formed of a heat resistant material, a lower skin formed of a heat resistant material and configured to thermally expand without contacting the side skin, and a number of frames fastened to the lower skin.

Another example of the present disclosure provides a heat shield for an aircraft. The heat shield comprises a lower skin configured to be exposed to heat of a jet engine, and side skins that are indirectly joined to the lower skin.

Yet another example of the present disclosure provides a method of operating an aircraft. A jet engine of the aircraft is operated. A strut aft fairing of the aircraft is shielded from exhaust heat from the jet engine with a heat shield. A lower skin of the heat shield is thermally expanded without the lower skin contacting a side skin of the heat shield. The lower skin is formed of a heat resistant material. The side skin is formed of a heat resistant material.

Clause 1: A heat shield for an aircraft, the heat shield comprising a side skin formed of a heat resistant material; a lower skin formed of a heat resistant material and configured to thermally expand without contacting the side skin; and a number of frames fastened to the lower skin.

Clause 2: The heat shield of Clause 1, wherein the side skin overlaps the lower skin.

Clause 3: The heat shield of Clause 1 or 2, wherein a gap is present between a first edge of the lower skin and an edge of the side skin.

Clause 4: The heat shield of any of Clauses 1-3, wherein the number of frames has compliance features configured to accommodate thermal expansion of the lower skin.

Clause 5: The heat shield of Clause 4, wherein the compliance features include slots formed in the number of frames.

Clause 6: The heat shield of Clause 4 or 5, wherein the compliance features include rounded corners set apart from the lower skin and the side skin.

Clause 7: The heat shield of any of Clauses 1-6, wherein the number of frames is formed of a metal, and wherein the lower skin and the side skin are formed of a number of composite materials.

Clause 8: The heat shield of any of Clauses 1-7 further comprising an air ingress restrictor associated with at least one of the side skin or the lower skin and configured to restrict air flow between the side skin and the lower skin into the heat shield.

Clause 9: A heat shield for an aircraft, the heat shield comprising a lower skin configured to be exposed to exhaust heat of a jet engine and side skins that are indirectly joined to the lower skin.

Clause 10: The heat shield of Clause 9 further comprising air ingress restrictors associated with at least one of the side skins or the lower skin, the air ingress restrictors configured to restrict air flow into the heat shield from gaps between the side skins and the lower skin.

Clause 11: The heat shield of Clause 10, wherein the air ingress restrictors are non-contact restrictors.

Clause 12: The heat shield of any of Clauses 9-11, further comprising a number of frames connected to the lower skin and having compliance features configured to accommodate thermal expansion of the lower skin.

Clause 13: The heat shield of Clause 12, wherein the compliance features include slots formed in the number of frames.

Clause 14: The heat shield of Clause 12 or 13, wherein the compliance features include rounded corners set apart from the lower skin and the side skins.

Clause 15: The heat shield of any of Clauses 12-14, wherein the number of frames is formed of a metal, and wherein the lower skin and side skins are formed of a number of composite materials.

Clause 16: The heat shield of any of Clauses 9-15, wherein the side skins extend past edges of the lower skin, shielding the lower skin from cooling air flow.

Clause 17: A method of operating an aircraft, the method comprising: operating a jet engine of the aircraft; shielding a strut aft fairing of the aircraft from exhaust heat from the jet engine with a heat shield; and thermally expanding a lower skin of the heat shield without the lower skin contacting a side skin of the heat shield, wherein the lower skin is formed of a heat resistant material, and wherein the side skin is formed of a heat resistant material.

Clause 18: The method of Clause 17 further comprising restricting air flow into the heat shield between the lower skin and the side skin.

Clause 19: The method of Clause 18, wherein restricting the air flow comprises blocking air flow into the heat shield by a seal between the lower skin and the side skin.

Clause 20: The method of Clause 18 or 19, wherein restricting the air flow comprises redirecting air flow entering the heat shield between the lower skin and the side skin.

The features and functions can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and features thereof, will best be understood by reference to the following detailed description of an illustrative example of the present disclosure when read in conjunction with the accompanying drawings, wherein:

DETAILED DESCRIPTION

The illustrative examples recognize and take into account one or more different considerations. The illustrative examples recognize and take into account that in currently available strut aft fairing heat shields, the side skins and lower skin are joined together. Some conventionally used strut aft fairing heat shields attach the side skins and lower skin rigidly together with a double row of rivets.

The illustrative examples recognize and take into account that directly joining the side skins to the lower skin may constrain the differential thermal expansion. Some of the currently used strut aft fairing heat shields also expose the outboard edges of the lower skin to the cooling fan flow. Exposing the outboard edges of the lower skin to the cooling fan flow may create abrupt thermal profiles in the skins. Creating abrupt thermal profiles in the skins may cause undesirable effects in the skins, such as distortion, buckling, or cracking.

The illustrative examples recognize and take into account that the constraining nature and severe thermal gradients of the currently available strut aft fairing heat shields may result in restrained thermal expansion and high thermal stresses. The illustrative examples recognize and take into account that, when heated, an increase in stress may be due to heat expansion at the joint of the side skin and the lower skin.

The illustrative examples provide independent thermal compliance of hot and cold components through elimination of the side skin to lower skin structural joint. Elimination of the joint between the side skin and the lower skin provides at least one of thermal isolation, lowering of component stresses, lowering weight, or lowering assembly costs. The illustrative examples relieve the stresses seen in a joined structure. The illustrative examples enable the lower skin to expand freely. In some illustrative examples, an aero seal is present to seal the side skin and lower skin.

Figure 1:
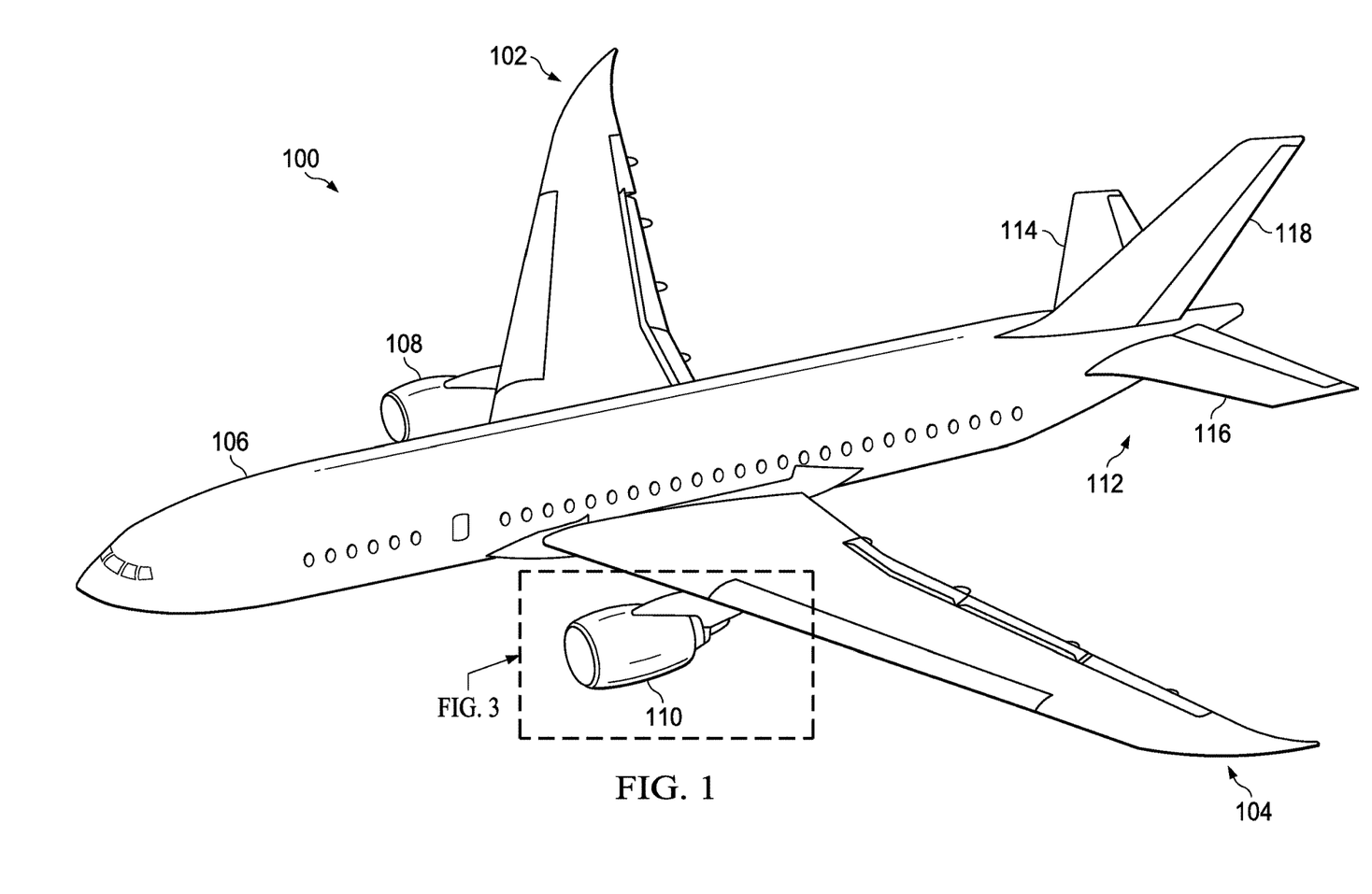
FIG. 1 is an illustration of an aircraft in which an illustrative example may be implemented.

With reference now to the figures, and in particular, with reference to FIG. 1, an illustration of an aircraft is depicted in accordance with an illustrative example. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft in which a heat shield may be implemented in accordance with an illustrative example. A heat shield of the illustrative examples may be positioned behind engine 110 and attached to wing 104. A heat shield of the illustrative examples may be positioned behind engine 110 and attached to wing 104 through a component, such as an aft fairing assembly. When the heat shield is positioned behind engine 110 and attached to wing 104, the heat shield is positioned to shield a respective strut aft fairing from engine heat. When the heat shield is positioned behind engine 110 and attached to wing 104, the heat shield may be referred to as a strut aft fairing heat shield.

A heat shield of the illustrative examples may be positioned behind engine 108 and attached to wing 102. A heat shield of the illustrative examples may be positioned behind engine 108 and attached to wing 102 through a component, such as an aft fairing assembly. When the heat shield is positioned behind engine 108 and attached to wing 102, the heat shield is positioned to shield a respective strut aft fairing from engine heat. When the heat shield is positioned behind engine 108 and attached to wing 102, the heat shield may be referred to as a strut aft fairing heat shield.

Figure 2:
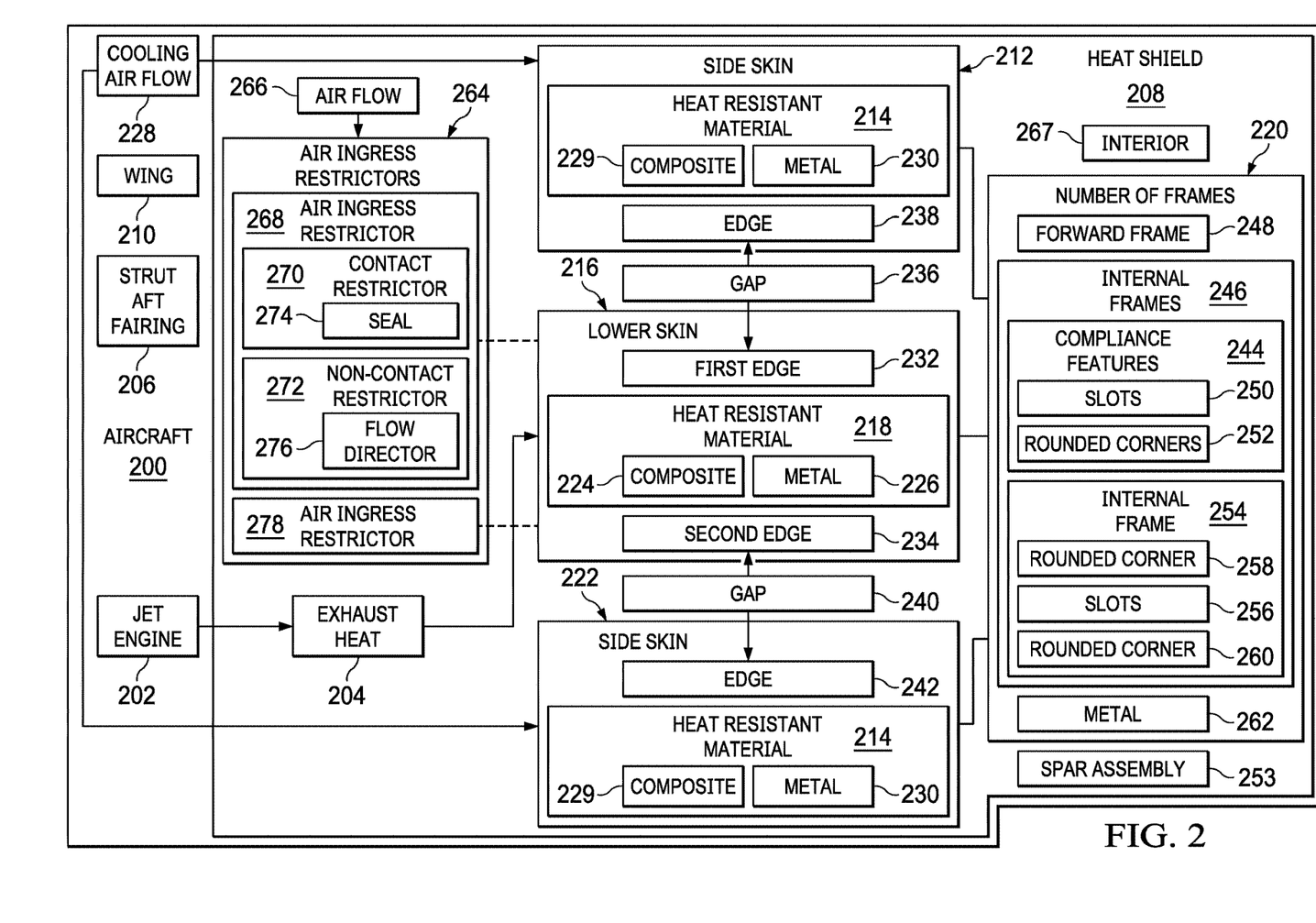
FIG. 2 is an illustration of a block diagram of an aircraft in which a heat shield operates in accordance with an illustrative example.

Turning now to FIG. 2, an illustration of a block diagram of an aircraft in which a heat shield operates is depicted in accordance with an illustrative example. Aircraft 100 of FIG. 1 may be a physical implementation of aircraft 200 of FIG. 2.

Aircraft 200 has jet engine 202 that generates exhaust heat 204. Jet engine 202 is connected to aircraft 200 in an underwing configuration. Strut aft fairing 206 is positioned aft and above jet engine 202. Heat shield 208 is connected to wing 210 through strut aft fairing 206 and is configured to shield strut aft fairing 206 from exhaust heat 204. Heat shield 208 may also be referred to as a strut aft fairing heat shield.

As used herein, a first component "connected to" or "joined to" a second component means that the first component can be connected directly or indirectly to the second component. In other words, additional components may be present between the first component and the second component. The first component is considered to be indirectly connected to the second component when one or more additional components are present between the two components. When the first component is directly connected to the second component, no additional components are present between the two components.

Heat shield 208 has side skin 212 formed of heat resistant material 214, lower skin 216 formed of heat resistant material 218 and configured to thermally expand without contacting side skin 212, and number of frames 220 fastened to lower skin 216. In some illustrative examples, number of frames 220 is fastened to lower skin 216 and side skin 212.

Heat shield 208 comprises lower skin 216 configured to be exposed to exhaust heat of jet engine 202, and side skins that are indirectly joined to lower skin 216. Side skins include side skin 212 and side skin 222.

Lower skin 216 and side skin 212 are not directly joined. Side skin 212 is indirectly joined to lower skin 216. Lower skin 216 and side skin 222 are not directly joined. Side skin 222 is indirectly joined to lower skin 216.

Lower skin 216 is exposed to exhaust heat 204. Heat resistant material 218 of lower skin 216 is selected to be exposed to exhaust heat 204 without undesirable effects. Exposure of lower skin 216 to exhaust heat 204 causes thermal expansion of lower skin 216. In some illustrative examples, heat resistant material 218 is composite 224. In some examples, composite 224 includes at least one of ceramic fibers or a ceramic matrix. In some illustrative examples, heat resistant material 218 is metal 226. In some illustrative examples, metal 226 is a high temperature titanium.

Heat resistant material 218 is selected to be inert to the exhaust gas of jet engine 202. Heat resistant material 218 is also selected to withstand the high temperatures of jet engine 202 along with acidic nature of the exhaust gas. In some illustrative examples, heat resistant material 218 is selected to withstand temperatures in the range of 1,000 degrees Fahrenheit to 1,200 degrees Fahrenheit.

Heat resistant material 214 of side skin 212 is configured to resist exhaust heat generated by jet engine 202. Temperatures experienced by side skin 212 are less than temperatures experienced by lower skin 216. Side skin 212 is exposed to cooling air flow 228.

In some illustrative examples, heat resistant material 214 is different from heat resistant material 218 of lower skin 216. Heat resistant material 214 is selected from composite 229 or metal 230. In some examples, composite 229 includes at least one of ceramic fibers and a ceramic matrix. In some examples, metal 230 is a high temperature titanium.

Heat resistant material 214 is selected to be inert to the exhaust gas of jet engine 202. Heat resistant material 214 is also selected to withstand the high temperatures along with acidic nature of the exhaust gas of jet engine 202. In some illustrative examples, heat resistant material 214 is selected to withstand temperatures below the range of temperatures experienced by heat resistant material 218.

To accommodate thermal expansion of lower skin 216, first edge 232 near side skin 212 is not attached to side skin 212. To accommodate thermal expansion of lower skin 216, second edge 234 is not connected to side skin 222.

In some illustrative examples, gap 236 is present between first edge 232 of lower skin 216 and edge 238 of side skin 212. In some illustrative examples, gap 240 is present between second edge 234 of lower skin 216 and edge 242 of side skin 222.

In some illustrative examples, side skin 212 overlaps lower skin 216. When side skin 212 overlaps lower skin 216, side skin 212 extends past first edge 232 of lower skin 216, shielding lower skin 216 from cooling air flow 228. In some illustrative examples, side skin 222 overlaps lower skin 216. When side skin 222 overlaps lower skin 216, side skin 222 extends past second edge 234 of lower skin 216, shielding lower skin 216 from cooling air flow 228.

In other illustrative examples, lower skin 216 overlaps the side skins, side skin 212 and side skin 222. When lower skin 216 overlaps the side skins, lower skin 216 shields the side skins, side skin 212 and side skin 222, from exhaust heat 204.

Number of frames 220 is connected to lower skin 216 to provide support to heat shield 208. As used herein, "a number of," when used with reference to items means one or more items. Thus, number of frames 220 is one or more frames. Number of frames 220 includes at least one of internal frames 246 or forward frame 248.

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required.

Internal frames 246 are internal to heat shield 208. Internal frames 246 are not exposed to external air, such as cooling air flow 228.

Number of frames 220 has compliance features 244 configured to accommodate thermal expansion of lower skin 216. In some illustrative examples, compliance features 244 includes slots 250 formed in number of frames 220. In these illustrative examples, slots 250 are formed in number of frames 220 in the bottom of number of frames 220 moving from lower skin 216 towards spar assembly 253.

Slots 250 accommodate thermal expansion of lower skin 216. Slots 250 are present in any desirable frames of number of frames 220. In some illustrative examples, slots 250 are present in only one frame of number of frames 220. In some illustrative examples, slots 250 are present in each frame of number of frames.

When lower skin 216 thermally expands, slots 250 open transversely to accommodate transverse expansion of lower skin 216. Slots 250 may also transversely expand to allow lower skin 216 to bend in the fore/aft direction.

In some illustrative examples, compliance features 244 includes rounded corners 252 set apart from lower skin 216 and the side skins, side skin 212 and side skin 222. Rounded corners 252 are present in any desirable frames of number of frames 220. In some illustrative examples, rounded corners 252 are present in only one frame of number of frames 220. In some illustrative examples, rounded corners 252 are present in each frame of number of frames. In some illustrative examples, rounded corners 252 are only present in internal frames 246. In some illustrative examples, rounded corners 252 change in size through the length of heat shield 208. In some illustrative examples, rounded corners 252 increase in size moving in aft direction in heat shield 208. In these illustrative examples, rounded corners 252 of flanges that connect number of frames 220 to side skin 212 and lower skin 216 allow number of frames 220 to be more compliant.

Compliance features 244 are formed in any desirable frames of number of frames 220. In some illustrative examples, compliance features 244 are formed in only internal frames 246. In other illustrative examples some of compliance features 244 are formed in forward frame 248.

When compliance features 244 are formed in forward frame 248, compliance features 244 in forward frame 248 do not provide entry of air into interior 267 of heat shield 208. For example, compliance features 244 in forward frame 248 may be locations with contoured arches but not slots.

As depicted, internal frame 254 is one of internal frames 246. Internal frame 254 has slots 256. Slots 256 extend upward within internal frame 254 from lower skin 216 towards spar assembly 253.

Internal frame 254 has rounded corner 258 set apart from lower skin 216 and side skin 212. Rounded corner 258 connects a first side of internal frame 254 adjacent side skin 212 and a bottom of internal frame 254 fastened to lower skin 216. Rounded corner 258 accommodates movement of lower skin 216 relative to side skin 212 due to thermal expansion of lower skin 216.

Internal frame 254 has rounded corner 260 set apart from lower skin 216 and side skin 222. Rounded corner 260 connects a second side of internal frame 254 adjacent side skin 222 and the bottom of internal frame 254 fastened to lower skin 216. Rounded corner 260 accommodates movement of lower skin 216 relative to side skin 222 due to thermal expansion of lower skin 216.

In some illustrative examples, number of frames 220 is formed of metal 262 to accommodate strains. In some illustrative examples, number of frames 220 is formed of metal 262, and lower skin 216 and side skin 212 are formed of a number of composite materials, composite 229 and composite 224.

In some illustrative examples, air ingress restrictors 264 are present in heat shield 208 to restrict air flow 266 into interior 267 of heat shield 208. Air ingress restrictors 264 are associated with at least one of the side skins or the lower skin, the air ingress restrictors configured to restrict air flow into the heat shield from gaps between the side skins and the lower skin.

Air flow 266 into interior 267 would undesirably affect components in interior 267 of heat shield 208. Air flow 266 into interior 267 may undesirably affect thermal insulation blankets in interior 267 of heat shield 208. The thermal insulation blankets protect spar assembly and other structures of aircraft 200 above heat shield 208 from the high temperature of exhaust heat 204. High speed air ingression undesirably affect the thermal blankets. Gap 236 and gap 240 are potential sources of air ingress.

In some illustrative examples, air ingress restrictors 264 are contact restrictors. In some illustrative examples, air ingress restrictors 264 are non-contact restrictors.

In some illustrative examples, air ingress restrictor 268 is associated with at least one of side skin 212 or lower skin 216 and is configured to restrict air flow 266 between side skin 212 and lower skin 216 into heat shield 208. Air ingress restrictor 268 is one of contact restrictor 270 or non-contact restrictor 272. When air ingress restrictor 268 is contact restrictor 270, air ingress restrictor 268 contacts lower skin 216 and side skin 212 to block air flow 266 into interior 267 of heat shield 208. An example of contact restrictor 270 is seal 274. Seal 274 is formed of any desirable material configured to withstand temperatures encountered by heat shield 208.

In some illustrative examples, air ingress restrictor 268 is non-contact restrictor 272. Air ingress restrictor 268 restricts air flow 266 between side skin 212 and lower skin 216 without contacting both lower skin 216 and side skin 212. In some illustrative examples, non-contact restrictor 272 takes the form of flow director 276. Flow director 276 restricts air flow 266 by redirecting air flow 266 entering heat shield 208 between lower skin 216 and side skin 212. In some illustrative examples, flow director 276 restricts air flow 266 by presenting a tortuous path to air flow 266.

As depicted, air ingress restrictor 278 is present. Air ingress restrictor 278 is present to restrict air flow 266 between side skin 222 and lower skin 216. Air ingress restrictor 278 is one of a contact restrictor or a non-contact restrictor. In some illustrative examples, air ingress restrictor 278 is the same as air ingress restrictor 268. In other illustrative examples, air ingress restrictor 278 is different from air ingress restrictor 268.

The illustration of aircraft 200 in FIG. 2 is not meant to imply physical or architectural limitations to the manner in which an illustrative example may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative example.

For example, although compliance features 244 are shown in number of frames 220, in other examples compliance features 244 are not present. In other illustrative examples, compliance features 244 are also present in external frames, such as forward frame 248.

In some illustrative examples, number of frames 220 are connected to only lower skin 216. In these illustrative examples, additional frames are connected to side skins, side skin 212 and side skin 222. In these illustrative examples, number of frames 220 is decoupled from the side skins, side skin 212 and side skin 222.

Figure 3:
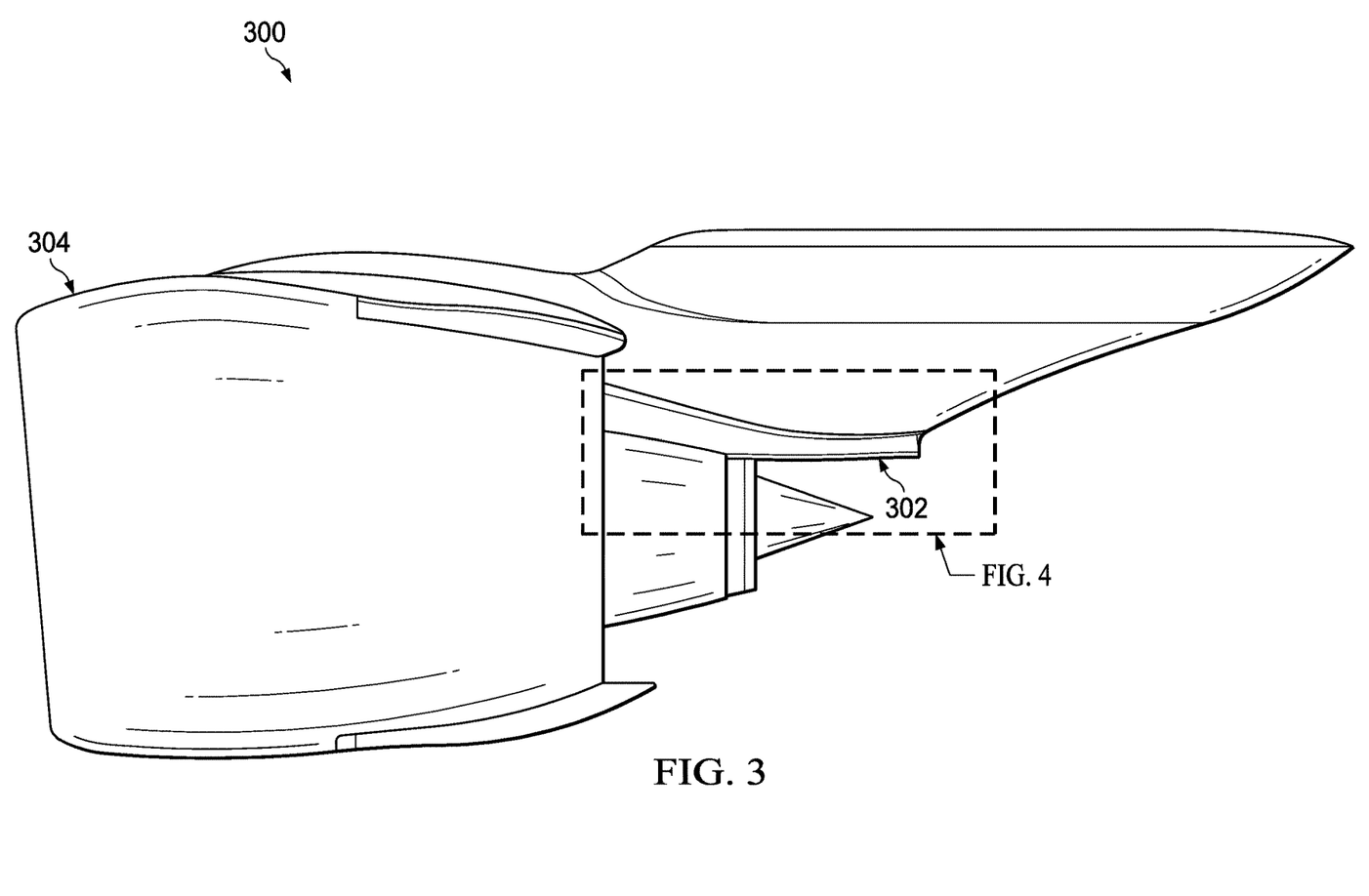
FIG. 3 is an illustration of a side view of a jet engine and a heat shield in an aircraft in accordance with an illustrative example.

Turning now to FIG. 3, an illustration of a side view of a jet engine and a heat shield in an aircraft is depicted in accordance with an illustrative example. View 300 is a view within the box labeled FIG. 3 in FIG. 1. View 300 is a view of an underwing engine configuration for an aircraft. Heat shield 302 is visible in view 300. Heat shield 302 is a strut aft fairing heat shield. Heat shield 302 is a physical implementation of heat shield 208 of FIG. 2.

In view 300, heat shield 302 is positioned downstream of exhaust of jet engine 304. Heat shield 302 is exposed to the exhaust heat of jet engine 304.

Figure 4:
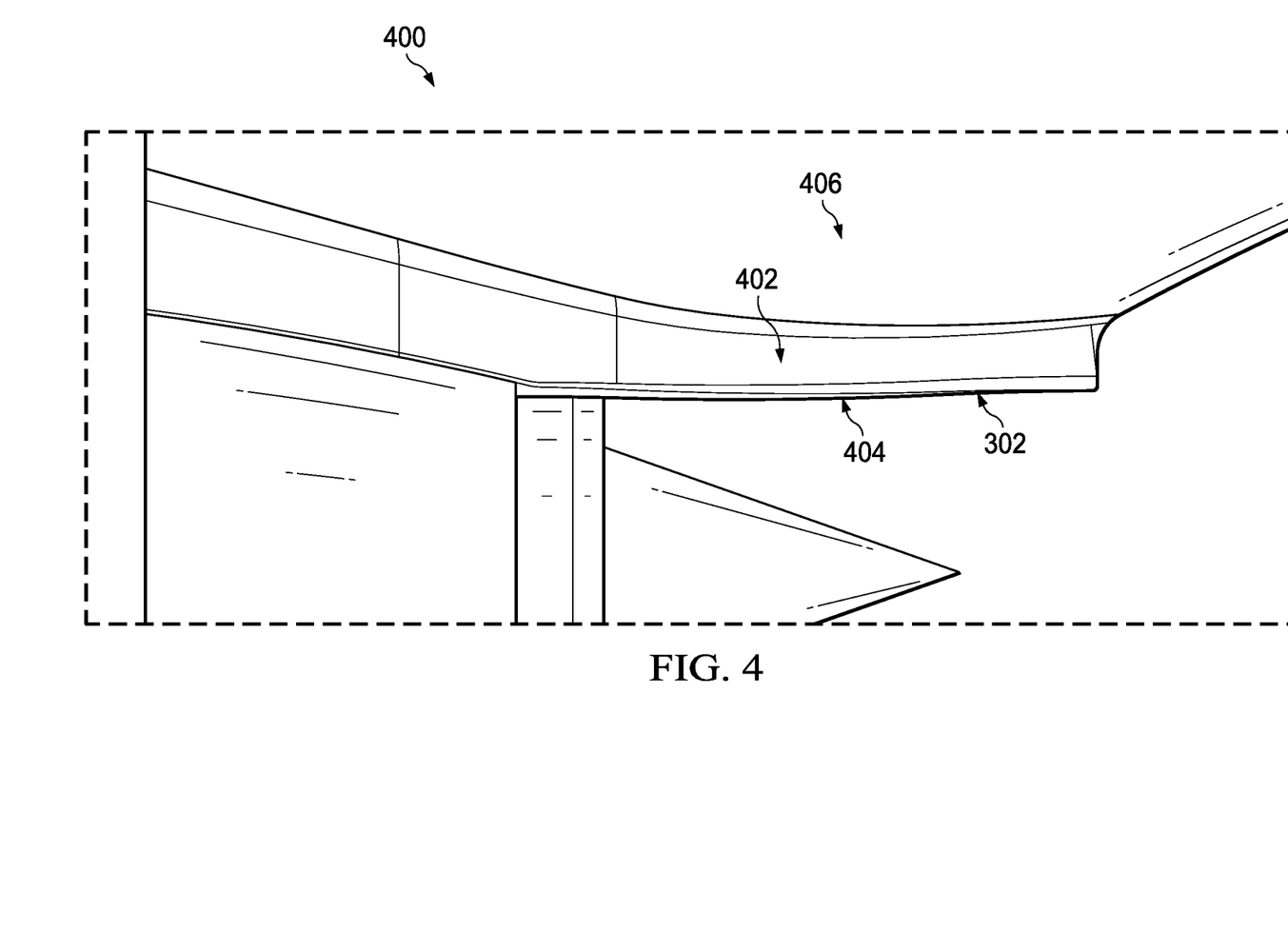
FIG. 4 is an illustration of a side view of a heat shield in an aircraft in accordance with an illustrative example.

Turning now to FIG. 4, an illustration of a side view of a heat shield in an aircraft is depicted in accordance with an illustrative example. In view 400 side skin 402 of heat shield 302 is visible. Side skin 402 of heat shield 302 is designed to encounter cooling fan flow. Heat shield 302 also has lower skin 404 exposed to exhaust heat from jet engine 304. Heat shield 302 is configured to shield structure 406 above heat shield 302 from the exhaust heat of jet engine 304.

Figure 5:
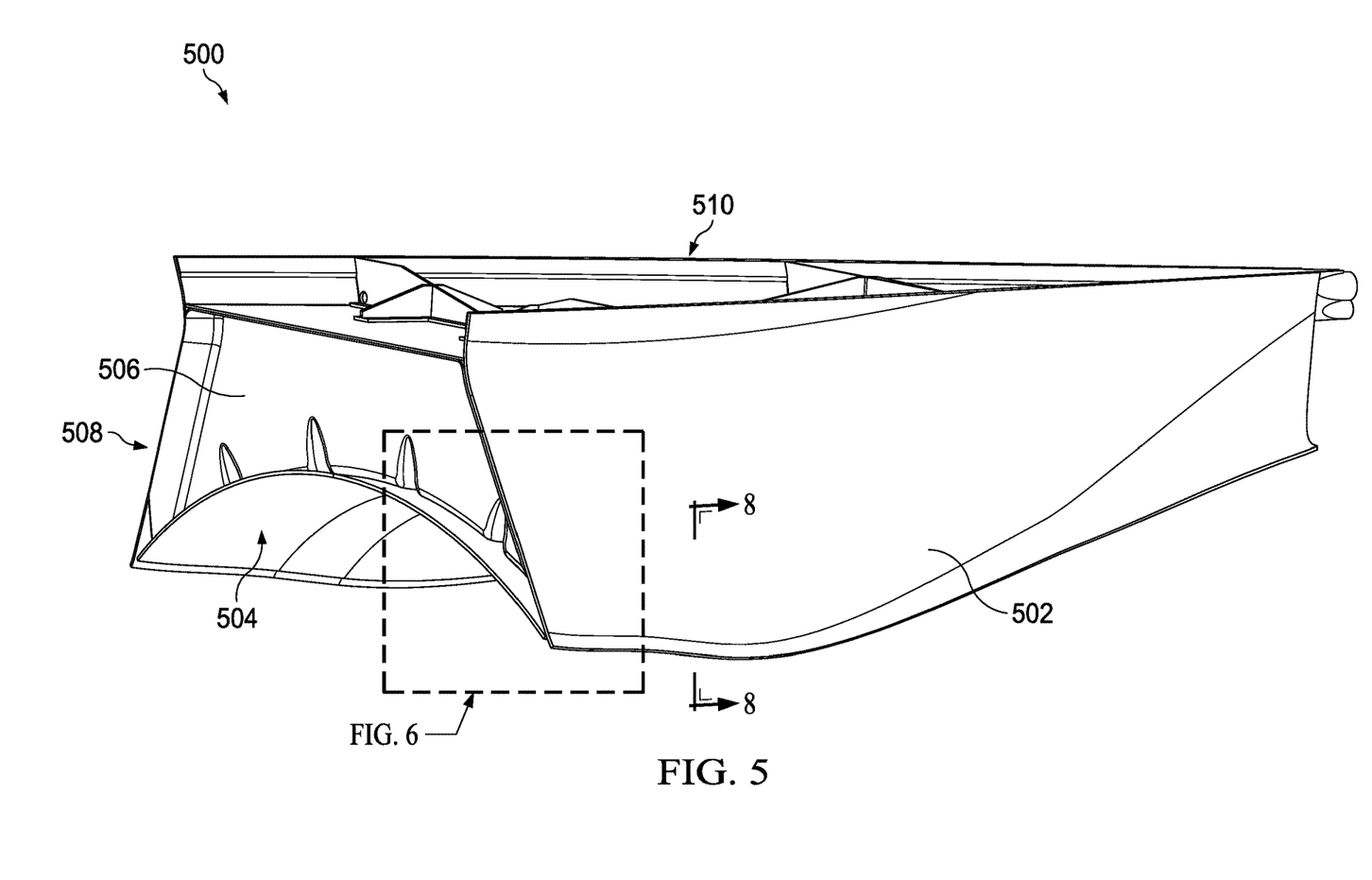
FIG. 5 is an illustration of an isometric view of a heat shield in accordance with an illustrative example.

Turning now to FIG. 5, an illustration of an isometric view of a heat shield is depicted in accordance with an illustrative example. Heat shield 500 may be implemented in aircraft 100 of FIG. 1. Heat shield 500 is a physical implementation of heat shield 208 of FIG. 2. Heat shield 500 may be an implementation of heat shield 302 of FIGS. 3 and 4. As depicted, heat shield 500 is a strut aft fairing heat shield.

Heat shield 500 comprises side skin 502 formed of a heat resistant material, lower skin 504 formed of a heat resistant material and configured to thermally expand without contacting side skin 502, and number of frames 506 fastened to lower skin 504. Lower skin 504 is exposed to exhaust heat from a jet engine. Side skin 502 is exposed to cooling air flow.

Heat shield 500 includes lower skin 504 configured to be exposed to exhaust heat of a jet engine, and side skins, side skin 502 and side skin 508, that are indirectly joined to lower skin 504. Each of lower skin 504, side skin 502, and side skin 508 are formed of highly heat resistant materials.

Number of frames 506 is connected to lower skin 504. Number of frames 506 is formed of a high heat resistant material. In some illustrative examples, number of frames 506 is formed of a metallic material to accommodate thermal expansion of lower skin 504. In some illustrative examples, number of frames 506 is formed of a metal, and lower skin 504 and side skin 502 are formed of a number of composite materials.

Spar assembly 510 acts as an interface between heat shield 500 and an upper structure. The upper structure (not depicted) is cooler than components of heat shield 500. The upper structure (not depicted) is cooler than lower skin 504. In some illustrative examples, spar assembly 510 is formed of a material with a lower heat resistance than the materials of side skin 502, lower skin 504, and side skin 508.

Figure 6:
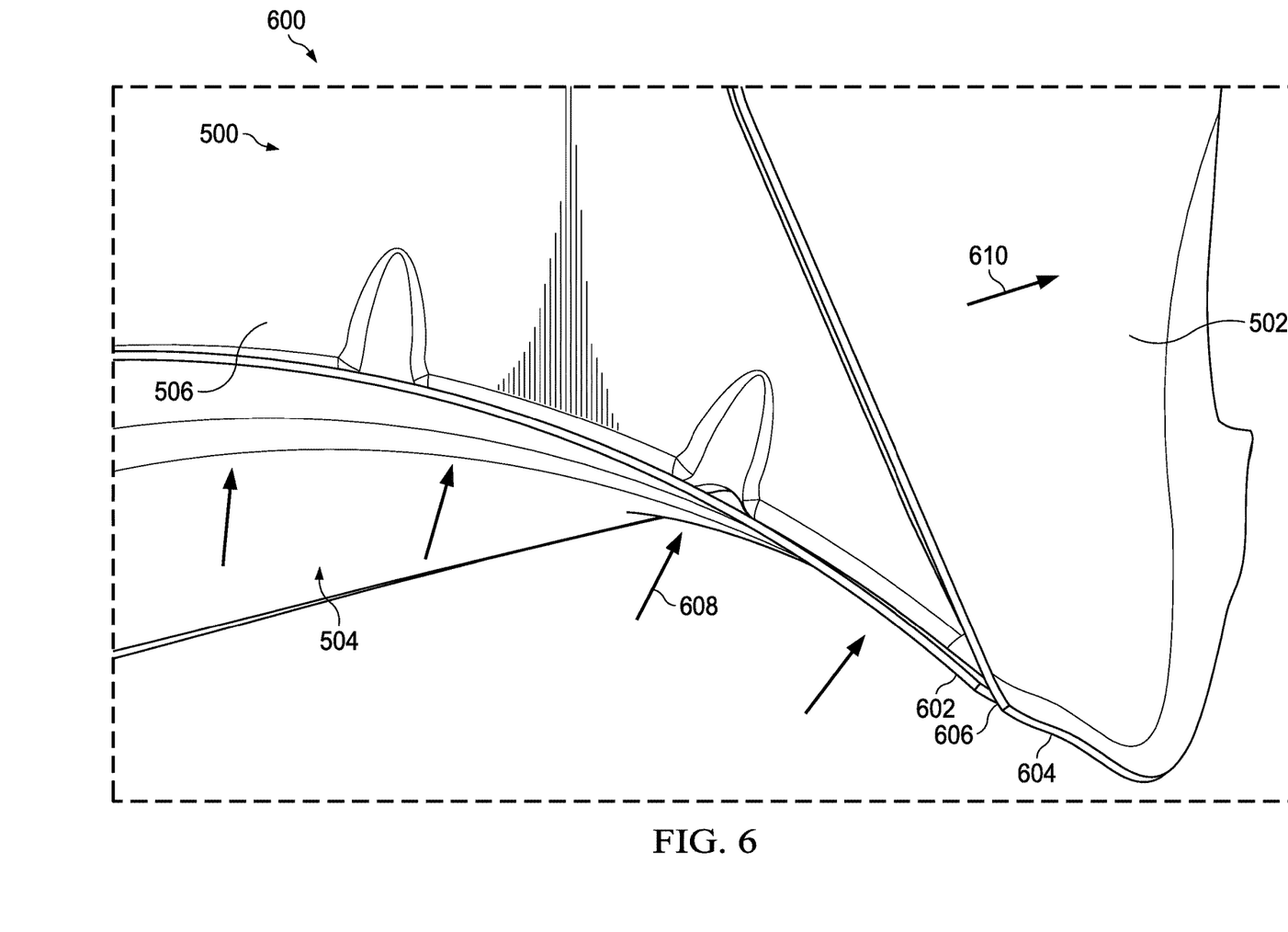
FIG. 6 is an illustration of a front isometric view of a portion of heat shield in accordance with an illustrative example.

Turning now to FIG. 6, an illustration of a front isometric view of a portion of heat shield is depicted in accordance with an illustrative example. View 600 is a view of a portion of heat shield 500 of FIG. 5. View 600 is a view within the box labeled as FIG. 6 within FIG. 5.

In view 600, first edge 602 of lower skin 504 is visible. In view 600, edge 604 of side skin 502 is visible. As depicted, there is no direct attachment of side skin 502 and lower skin 504. Because there is no direct attachment of side skin 502 and lower skin 504, free thermal expansion of lower skin 504 is accommodated.

In this illustrative example, gap 606 is present between first edge 602 of lower skin 504 and edge 604 of side skin 502. Gap 606 accommodates thermal expansion of lower skin 504 due to exhaust heat 608 from a jet engine. Gap 606 allows for thermal expansion of lower skin 504 without lower skin 504 contacting side skin 502.

As depicted, side skin 502 overlaps lower skin 504. By overlapping lower skin 504, side skin 502 shields lower skin 504 from cooling air flow 610.

Figure 7:
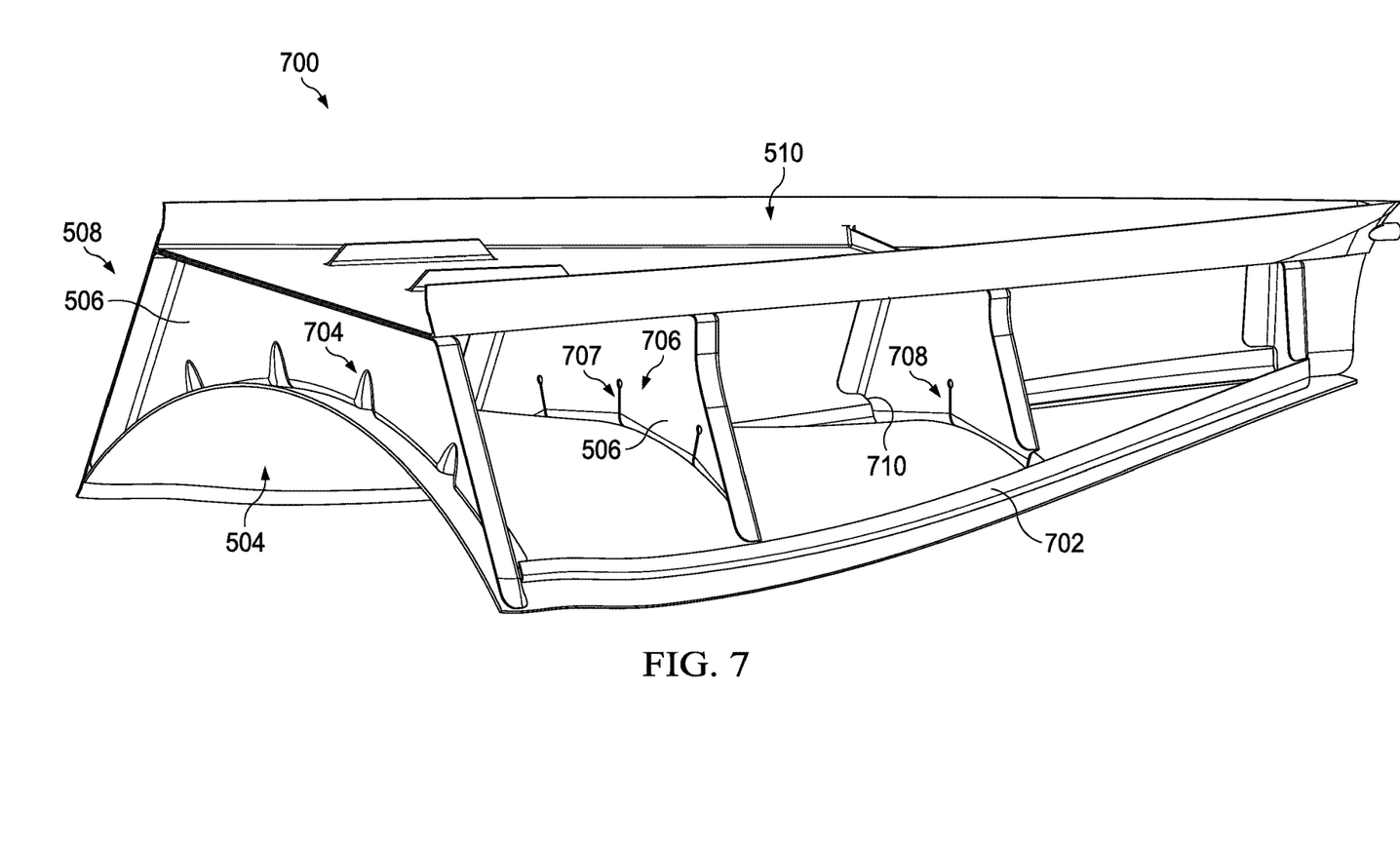
FIG. 7 is an illustration of an isometric view of a heat shield with a side skin removed in accordance with an illustrative example.

Turning now to FIG. 7, an illustration of an isometric view of a heat shield with a side skin removed is depicted in accordance with an illustrative example. View 700 is a view of heat shield 500 of FIG. 5 with side skin 502 removed for illustrative purposes. In view 700, side skin 502 is removed only to show internal structure and features of heat shield 500. In view 700, thermal blankets within the interior of heat shield 500 are not shown for clarity.

As depicted, heat shield 500 has air ingress restrictor 702 associated with at least one of the side skin or lower skin 504 and configured to restrict air flow between the side skin and lower skin 504 into heat shield 500. As depicted, air ingress restrictor 702 is a contact restrictor. As depicted, air ingress restrictor 702 is a high temperature aero seal. Air ingress restrictor 702 restricts air flow between the side skin and lower skin 504 by contacting the side skin and lower skin 504. By contacting the side skin and lower skin 504, air ingress restrictor 702 physically blocks air flow into heat shield 500. In these illustrative examples, the high temperature aero seal blocks air ingression into internal cavity.

In other non-depicted examples, air ingress restrictors in heat shield 500 are non-contact restrictors. In some illustrative examples, air ingress restrictors restrict air ingress by redirecting air flow between the side skin and lower skin 504.

Number of frames 506 is fastened to lower skin 504 having compliance features configured to accommodate thermal expansion of the lower skin. Number of frames 506 includes forward frame 704 and internal frames 706. As depicted, number of frames 506 have compliance features 707 configured to accommodate thermal expansion of lower skin 504. Compliance features 707 include slots 708 formed in number of frames 506. Compliance features 707 include rounded corners 710 set apart from lower skin 504 and the side skin.

As depicted, internal frames 706 are designed with compliance features 707 to minimize longitudinal and transverse thermal expansion constraints on lower skin 504. As depicted, forward frame 704 does not have slots or rounded corners. As depicted, forward frame 704 has compliance features 707. Compliance features 707 of forward frame 704 include thinner areas of material.

Figure 8:
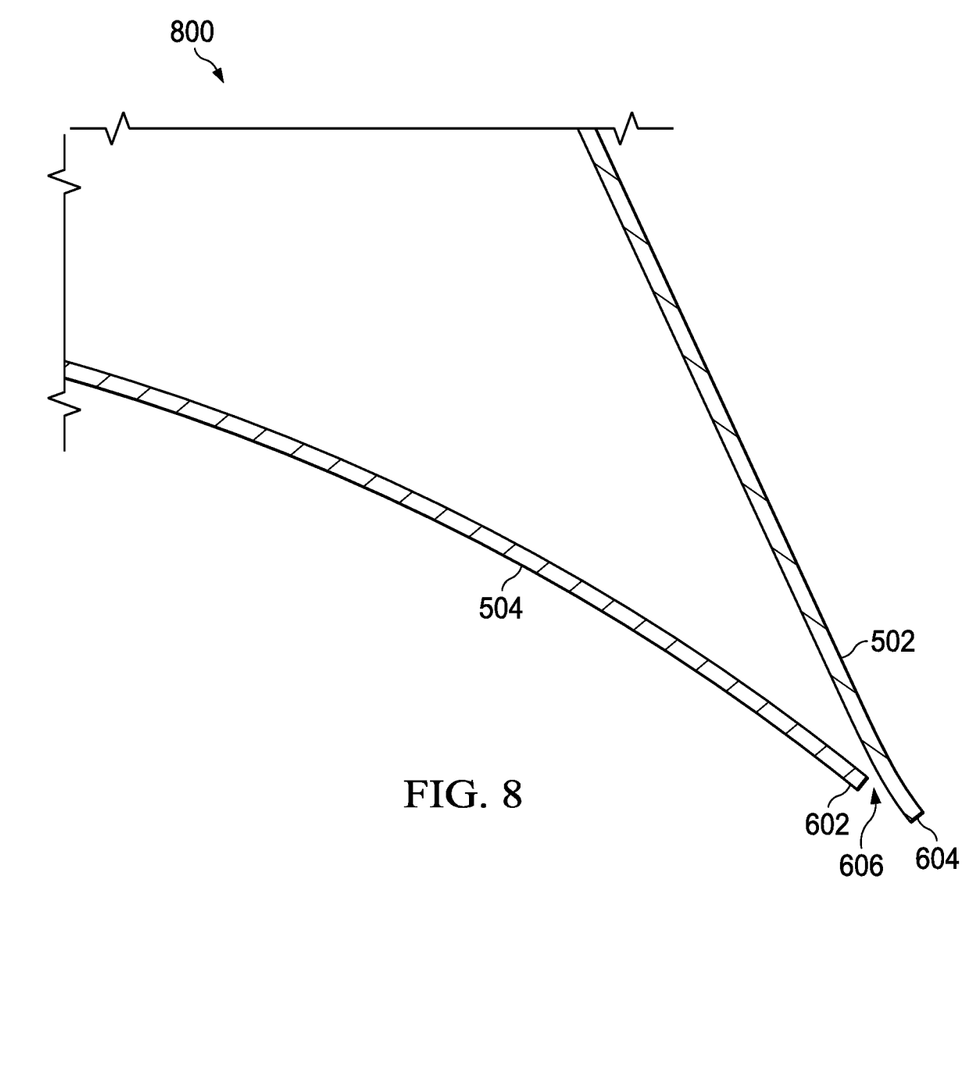
FIG. 8 is an illustration of a cross-sectional view of a portion of a heat shield in accordance with an illustrative example.

Turning now to FIG. 8, an illustration of a cross-sectional view of a portion of a heat shield is depicted in accordance with an illustrative example. View 800 is a cross-sectional view of first edge 602 and edge 604 of heat shield 500.

In view 800, gap 606 between first edge 602 and edge 604 is more clearly visible. As depicted, side skin 502 overlaps lower skin 504. Side skin 502 extends past first edge 602 of lower skin 504, shielding lower skin 504 from cooling air flow. As depicted, there is no attachment between side skin 502 and lower skin 504. Having no direct connection between side skin 502 and lower skin 504 allows for independent thermal expansion of lower skin 504.

Figure 9:
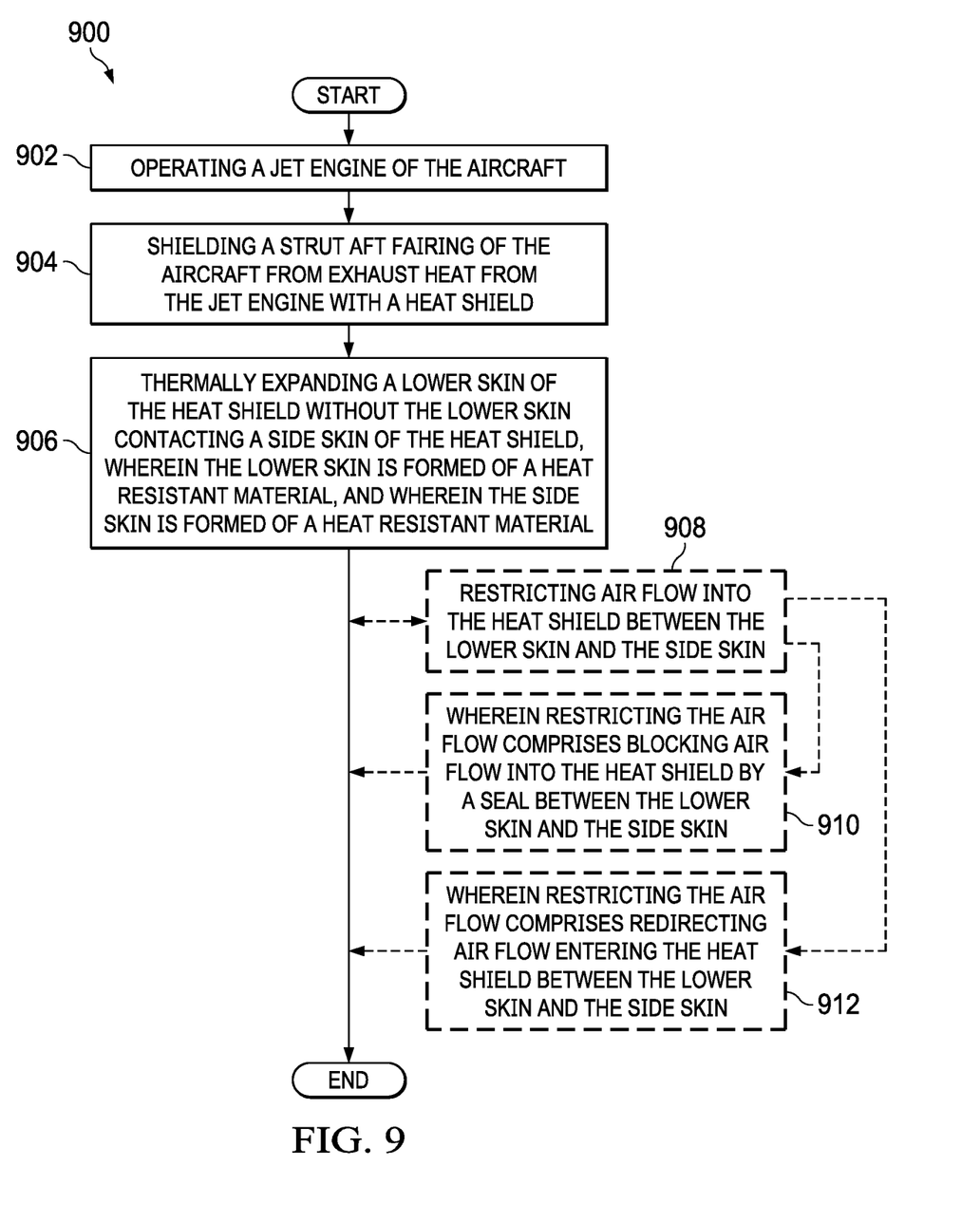
FIG. 9 is an illustration of a flowchart of a method for operating an aircraft in accordance with an illustrative example.

Turning now to FIG. 9, an illustration of a flowchart of a method for operating an aircraft is depicted in accordance with an illustrative example. Method 900 may be used to operate aircraft 100 of FIG. 1. Method 900 may be used to operate aircraft 200 of FIG. 2. Method 900 may be used to operate an aircraft with heat shield 302 of FIGS. 3-4. Method 900 may be used to operate an aircraft with heat shield 500 of FIGS. 5-8.

Method 900 operates a jet engine of the aircraft (operation 902). Method 900 shields a strut aft fairing of the aircraft from exhaust heat from the jet engine with a heat shield (operation 904). Method 900 thermally expands a lower skin of the heat shield without the lower skin contacting a side skin of the heat shield, wherein the lower skin is formed of a heat resistant material, and wherein the side skin is formed of a heat resistant material (operation 906). Afterwards, method 900 terminates.

In some illustrative examples, method 900 restricts air flow into the heat shield between the lower skin and the side skin (operation 908). Restricting the air flow into the heat shield is performed in any desirable fashion.

In some illustrative examples, restricting the air flow comprises blocking air flow into the heat shield by a seal between the lower skin and the side skin (operation 910). In these illustrative examples, an air ingress restrictor of the heat shield is a contact restrictor. In these illustrative examples, the contact restrictor is the seal. The seal takes any desirable form. The seal may be a high temperature aero seal.

In some illustrative examples, restricting the air flow comprises redirecting air flow entering the heat shield between the lower skin and the side skin (operation 912). In these illustrative examples, an air ingress restrictor of the heat shield is a non-contact restrictor. In these illustrative examples, the non-contact restrictor is a flow director. The flowcharts and block diagrams in the different depicted examples illustrate the architecture, functionality, and operation of some possible implementations of apparatuses and methods in an illustrative example. In this regard, each block in the flowcharts or block diagrams may represent at least one of a module, a segment, a function, or a portion of an operation or step.

In some alternative implementations of an illustrative example, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional. For example, some operations of operation 908 through operation 912 may be optional.

Figure 10:
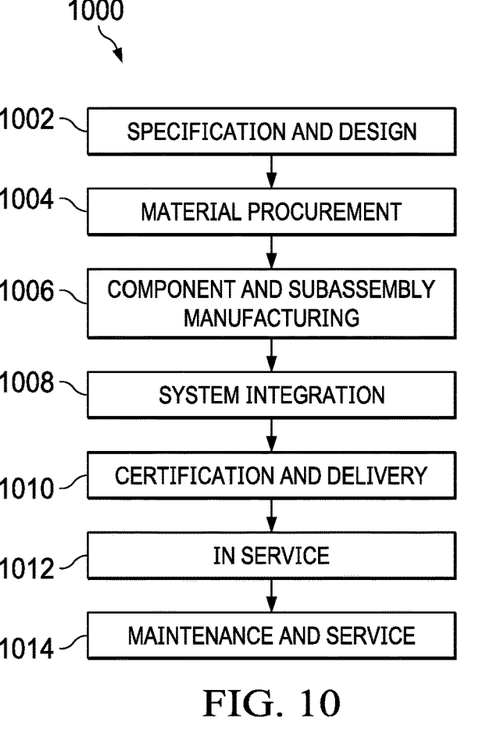
FIG. 10 is an illustration of an aircraft manufacturing and service method in a form of a block diagram in accordance with an illustrative example.
Figure 11:
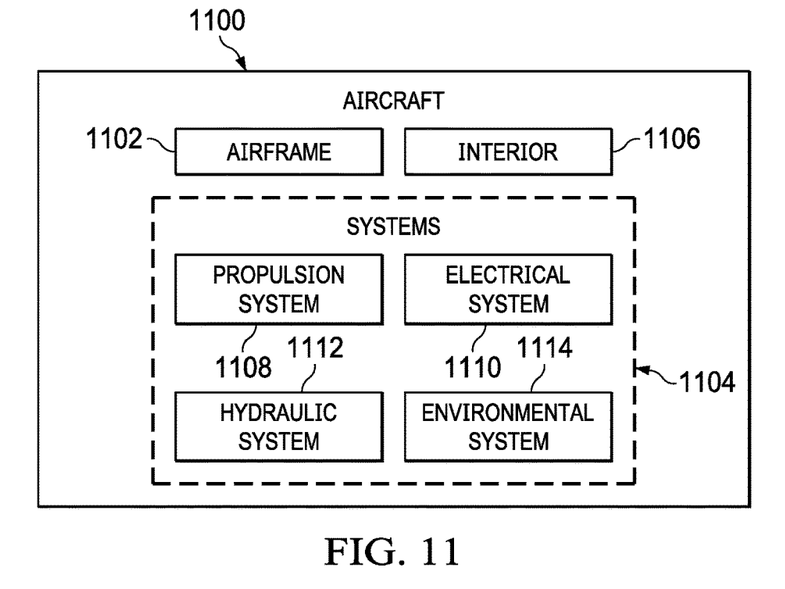
FIG. 11 is an illustration of an aircraft in a form of a block diagram in which an illustrative example may be implemented.

Illustrative examples of the present disclosure may be described in the context of aircraft manufacturing and service method 1000 as shown in FIG. 10 and aircraft 1100 as shown in FIG. 11. Turning first to FIG. 10, an illustration of an aircraft manufacturing and service method is depicted in accordance with an illustrative example. During pre-production, aircraft manufacturing and service method 1000 may include specification and design 1002 of aircraft 1100 in FIG. 11 and material procurement 1004.

During production, component and subassembly manufacturing 1006 and system integration 1008 of aircraft 1100 takes place. Thereafter, aircraft 1100 may go through certification and delivery 1010 in order to be placed in service 1012. While in service 1012 by a customer, aircraft 1100 is scheduled for routine maintenance and service 1014, which may include modification, reconfiguration, refurbishment, or other maintenance and service.

Each of the processes of aircraft manufacturing and service method 1000 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 11, an illustration of an aircraft is depicted in which an illustrative example may be implemented. In this example, aircraft 1100 is produced by aircraft manufacturing and service method 1000 of FIG. 10 and may include airframe 1102 with plurality of systems 1104 and interior 1106. Examples of systems 1104 include one or more of propulsion system 1108, electrical system 1110, hydraulic system 1112, and environmental system 1114. Any number of other systems may be included.

Apparatuses and methods embodied herein may be employed during at least one of the stages of aircraft manufacturing and service method 1000. One or more illustrative examples may be manufactured or used during at least one of component and subassembly manufacturing 1006, system integration 1008, in service 1012, or maintenance and service 1014 of FIG. 10. For example, heat shield 208 is assembled during component and subassembly manufacturing 1006. Heat shield 208 shields components of aircraft 200 from exhaust heat 204 while aircraft 200 is in service 1012. In some illustrative examples, heat shield 208 is installed or replaced during maintenance and service 1014. As an example, method 900 may be used during service 1012 to shield components of aircraft 1100 from exhaust heat. Heat shield 208 may be a component of aircraft 1100 such as a component of airframe 1102.

The illustrative examples present a heat shield with improved buckling resistance, improved fatigue performance, and reduced cracking risk. The heat shield has corresponding aerodynamics of a conventional jet engine exhaust heat shield. The illustrative examples may provide superior aerodynamics compared to alternate multi-piece segmented designs.

The illustrative examples separate and thermally isolate the hot (lower) heat shield skin which is directly exposed to the engine exhaust plume, from the much cooler side skins which are exposed to the cooling fan flow air stream. Internal support structure, including frames, is configured to allow independent free thermal expansion of the hot and cold skins. Allowing for independent free thermal expansion relieves the thermal stresses that typically cause aero surface distortion, shortened service life, and sometimes structural failure. The Independent Thermal Compliance this design facilitates greatly lowers the thermal stresses generally present.

An aft strut heat shield comprises a lower skin and two side skins. The side skins are not joined to each other. In some illustrative examples, the side skins have an over lapping edge that extends past a lower skin planar projected surface. In some illustrative examples, a high temperature aero seal is positioned between a gap formed by the lower skin and a side skin. In some illustrative examples, the lower skin and side skin having varying heat materials.

The illustrative examples relieve the stresses typically present in a joined structure. The illustrative examples enable the lower skin to expand freely.

The description of the different illustrative examples has been presented for purposes of illustration and description, and is not intended to be exhaustive or limited to the examples in the form disclosed. Many modifications and variations will be apparent to those of ordinary skill in the art. Further, different illustrative examples may provide different features as compared to other illustrative examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A heat shield for an aircraft, the heat shield comprising:
a side skin formed of a heat resistant material;
a lower skin formed of a heat resistant material and configured to thermally expand without contacting the side skin;
a number of frames fastened to the lower skin; and
an air ingress restrictor associated with one of the side skin or the lower skin, the air ingress restrictor configured to restrict air flow between the side skin and the lower skin into the heat shield without contacting both the lower skin and the side skin.

2. The heat shield of claim 1, wherein the side skin overlaps the lower skin.

3. The heat shield of claim 1, wherein a gap is present between a first edge of the lower skin and an edge of the side skin.

4. The heat shield of claim 1, wherein the number of frames has compliance features configured to accommodate thermal expansion of the lower skin.

5. The heat shield of claim 4, wherein the compliance features include slots formed in the number of frames.

6. The heat shield of claim 4, wherein the compliance features include rounded corners set apart from the lower skin and the side skin.

7. The heat shield of claim 1, wherein the number of frames is formed of a metal, and wherein the lower skin and the side skin are formed of a number of composite materials.

8. The heat shield of claim 1, wherein the air ingress restrictor is a flow director configured to redirect the air flow entering the heat shield between the side skin and the lower skin.

9. A heat shield for an aircraft, the heat shield comprising:
a lower skin configured to be exposed to exhaust heat of a jet engine;
side skins that are indirectly joined to the lower skin; and
an air ingress restrictor associated with at least one of the side skins or the lower skin, the air ingress restrictor configured to restrict air flow into the heat shield from gaps between the side skins and the lower skin without contacting both the lower skin and the side skins.

10. The heat shield of claim 9, wherein the air ingress restrictor is a flow director configured to redirect the air flow entering the heat shield between the side skins and the lower skin.

11. The heat shield of claim 9, wherein the air ingress restrictor continually extends from a forward end of the heat shield to an aft end of the heat shield.

12. The heat shield of claim 9 further comprising:
a number of frames connected to the lower skin and having compliance features configured to accommodate thermal expansion of the lower skin.

13. The heat shield of claim 12, wherein the compliance features include slots formed in the number of frames.

14. The heat shield of claim 12, wherein the compliance features include rounded corners set apart from the lower skin and the side skins.

15. The heat shield of claim 12, wherein the number of frames is formed of a metal, and wherein the lower skin and the side skins are formed of a number of composite materials.

16. The heat shield of claim 9, wherein the side skins extend past edges of the lower skin, shielding the lower skin from cooling air flow.

17. A method of operating an aircraft, the method comprising:
operating a jet engine of the aircraft;
shielding a strut aft fairing of the aircraft from exhaust heat from the jet engine with a heat shield;
thermally expanding a lower skin of the heat shield without the lower skin contacting a side skin of the heat shield, wherein the lower skin is formed of a heat resistant material and is fastened to a number of frames, and wherein the side skin is formed of a heat resistant material; and
restricting air flow into the heat shield between the lower skin and the side skin with an air ingress restrictor associated with one of the side skin or the lower skin, wherein the air ingress restrictor does not contact both the lower skin and the side skin.

18. The method of claim 17, wherein the air ingress restrictor is a flow director and restricting the air flow comprises redirecting the air flow.

19. The method of claim 18, wherein redirecting the air flow comprises presenting a tortuous path to the air flow.

20. The method of claim 17, wherein the air ingress restrictor continually extends from a forward end of the heat shield to an aft end of the heat shield.

* * * * *